(12) United States Patent
Balfour

(10) Patent No.: US 8,703,851 B2
(45) Date of Patent: *Apr. 22, 2014

(54) POLY(PHENYLENE ETHER) COMPOSITION AND ARTICLE

(71) Applicant: SABIC Innovative Plastics IP B.V., Bergen op Zoom (NL)

(72) Inventor: Kim G. Balfour, Delanson, NY (US)

(73) Assignee: Sabic Innovative Plastics IP B.V. (NL)

( * ) Notice: Subject to any disclaimer, the term of this patent is extended or adjusted under 35 U.S.C. 154(b) by 0 days.

This patent is subject to a terminal disclaimer.

(21) Appl. No.: 13/693,066

(22) Filed: Dec. 4, 2012

(65) Prior Publication Data

US 2014/0088229 A1 Mar. 27, 2014

Related U.S. Application Data

(63) Continuation-in-part of application No. 13/626,953, filed on Sep. 26, 2012.

(51) Int. Cl.
*C08K 5/523* (2006.01)

(52) U.S. Cl.
USPC .......................... 524/127; 524/140; 524/141

(58) Field of Classification Search
USPC .......................................... 524/127, 140, 141
See application file for complete search history.

(56) References Cited

U.S. PATENT DOCUMENTS

| | | | |
|---|---|---|---|
| 3,281,383 A | 10/1966 | Zelinski et al. | |
| 3,306,874 A | 2/1967 | Hay | |
| 3,639,517 A | 2/1972 | Kitchen et al. | |
| 3,660,531 A | 5/1972 | Lauchlan et al. | |
| 4,180,530 A | 12/1979 | Bi et al. | |
| 5,234,994 A | 8/1993 | Shiraki et al. | |
| 6,127,487 A | 10/2000 | Ahmed et al. | |
| 6,274,670 B1 | 8/2001 | Adedeji et al. | |
| 7,576,150 B2 | 8/2009 | Klei et al. | |
| 7,585,906 B2 | 9/2009 | Klei et al. | |
| 7,622,522 B2 | 11/2009 | Qiu et al. | |
| 7,847,032 B2 | 12/2010 | Guo et al. | |
| 2003/0096123 A1 | 5/2003 | Yeager | |
| 2007/0112132 A1 | 5/2007 | Zhao et al. | |
| 2008/0045656 A1 | 2/2008 | Balfour et al. | |
| 2008/0206449 A1 | 8/2008 | Klei et al. | |
| 2008/0206468 A1 | 8/2008 | Klei et al. | |
| 2008/0251271 A1 | 10/2008 | Jeyakumar et al. | |
| 2009/0211967 A1 | 8/2009 | Deslmann et al. | |
| 2010/0012373 A1 | 1/2010 | Guo et al. | |
| 2010/0122845 A1 | 5/2010 | Guo et al. | |
| 2010/0139944 A1 | 6/2010 | Guo et al. | |
| 2011/0266024 A1 | 11/2011 | Qiu et al. | |

FOREIGN PATENT DOCUMENTS

| | | |
|---|---|---|
| EP | 1512725 A1 | 3/2005 |
| WO | 2010030478 A2 | 3/2010 |

OTHER PUBLICATIONS

International Search Report; International Application No. PCT/US2012/039047; International Filing Date May 23, 2012; 5 pages.
Written Opinon of the International Searching Authority; International Application No. PCT/US2012/039047; International Filing Date May 23, 2012; 6 pages.
International Search Report; International Application No. PCT/US2012/067829; International Filing Date Dec. 5, 2012; 6 pages.
Written Opinon of the International Searching Authority; International Application No. PCT/US2012/067829; International Filing Date Dec. 5, 2012; 5 pages.
U.S. Appl. No. 13/153,067, filed with the USPTO Jun. 3, 2011.
U.S. Appl. No. 13/626,953, filed with the USPTO Sep. 26, 2012.
U.S. Appl. No. 13/693,076, filed with the USPTO Dec. 4, 2012.
Kuraray SEPTON S2104 Thermoplastic Rubber, Information Sheet, downloaded from http://www.matweb.com/search/datasheet.aspx?matguid=fde7a35f9f574598bc6bf726914d13da&ckck=1[Jun. 5, 2012 6:44:40 AM] on Jun. 5, 2012, 2 pages.
Gachter and Muller, EDs, "Plastics Additives Handbook; Stabilizers, Processing Aids, Plasticizers, Fillers, Reinforcements, Colorants for Thermoplastics, 3rd Edition", New York: Hanser Publishers, 1990, in Chapter 9, "Fillers and Reinforcements", by H. P. Schlumpf.

*Primary Examiner* — Peter Szekely
(74) *Attorney, Agent, or Firm* — Cantor Colburn LLP

(57) ABSTRACT

A composition includes specific amounts of a poly(phenylene ether), a radial block copolymer, a polystyrene-poly(ethylene-butylene)polystyrene triblock copolymer, an organophosphate ester, a hydrocarbon resin, and benzoin. The composition exhibits a desirable balance of multiaxial impact strength, light transmittance, and optical clarity, and it can be used to mold a variety of articles including animal cages, ink cartridges, tubes, pipes, and pipe fittings.

14 Claims, No Drawings

POLY(PHENYLENE ETHER) COMPOSITION AND ARTICLE

CROSS-REFERENCE TO RELATED APPLICATIONS

This application is a continuation-in-part of U.S. patent application Ser. No. 13/626,953, filed Sep. 26, 2012, which is incorporated herein by reference in its entirety.

BACKGROUND OF THE INVENTION

Compositions containing poly(phenylene ether)s and styrenic block copolymers are known and valued for their improved properties relative to either resin type alone. For example, U.S. Pat. No. 3,660,531 to Lauchlan et al. describes blends of "polyphenylene oxide resin" with styrene-butadiene block copolymers and teaches that the blends exhibit a useful combination of low-temperature melt processability, high impact strength, and high flexural strength. As another example, U.S. Pat. No. 5,234,994 to Shiraki et al. describes blends of a "polyphenylene ether", a polystyrene, and a block copolymer of a vinyl aromatic hydrocarbon and a conjugated diene. The blends are described as offering improved transparency, impact resistance, surface hardness, heat resistance, and gloss. As yet another example, U.S. Pat. No. 6,274,670 to Adedeji et al. describes blends of a "polyphenylene ether resin", a non-elastomeric styrenic resin, and an unsaturated elastomeric styrenic block copolymer. When the non-elastomeric styrenic resin is a styrene-butadiene block copolymer having at least 50 weight percent styrene, the compositions are semi-transparent and exhibit enhanced processability.

Despite these advances, poly(phenylene ether) compositions with high light transmittance, low haze, and high impact-resistance remain an elusive target. Although the use of optical enhancing agents and flame retardants can improve light transmittance and reduce haze, they also reduce impact strength. There is therefore a need in the packaging and healthcare industries, among others, for poly(phenylene ether) compositions that exhibit an improved balance of high light transmittance, low haze, and high impact strength.

BRIEF SUMMARY OF EMBODIMENTS OF THE INVENTION

One embodiment is a composition comprising: 30 to 60 weight percent of a poly(phenylene ether); 10 to 40 weight percent of a radial block copolymer of an alkenyl aromatic monomer comprising styrene and a conjugated diene comprising butadiene; wherein the radial block copolymer comprises 60 to 75 weight percent of poly(alkenyl aromatic) content and has a number average molecular weight of 50,000 to 70,000 atomic mass units; 5 to 20 weight percent of a polystyrene-poly(ethylene-butylene)-polystyrene triblock copolymer having a polystyrene content based on the weight of the triblock copolymer of 55 to 80 weight percent; 5 to 20 weight percent of an organophosphate ester selected from the group consisting of resorcinol bis(diphenyl phosphate), triphenyl phosphate, alkylated triphenyl phosphate, and combinations thereof; a hydrocarbon resin selected from the group consisting of hydrogenated alicyclic hydrocarbon resins, hydrogenated terpene resins, and combinations thereof; wherein the hydrocarbon resin has a softening point of 120 to 180° C. measured according to ASTM E28; wherein the hydrocarbon resin is present in an amount effective to provide the composition with a multiaxial impact strength of at least 25 joules, measured at 23° C. according to ASTM D3763-08a; and 0.05 to 2 weight percent of benzoin; wherein the composition comprises less than 0.5 weight percent tridecyl phosphite; wherein the composition comprises less than or equal to 1 weight percent of fillers; and wherein all weight percents are based on the total weight of the composition, unless a different weight basis is specified.

Another embodiment is a composition comprising: 40 to 50 weight percent of a poly(2,6-dimethyl-1,4-phenylene ether); 20 to 30 weight percent of a radial block copolymer of styrene and butadiene; wherein the radial block copolymer comprises 60 to 75 weight percent of polystyrene content and has a number average molecular weight of 50,000 to 70,000 atomic mass units; 8 to 17 weight percent of a polystyrene-poly(ethylene-butylene)-polystyrene triblock copolymer; wherein the polystyrene-poly(ethylene-butylene)-polystyrene triblock copolymer having a polystyrene content of 60 to 75 weight percent based on the weight of the polystyrene-poly(ethylene-butylene)-polystyrene triblock copolymer; 7 to 17 weight percent of resorcinol bis(diphenyl phosphate); 3 to 8 weight percent of a hydrogenated terpene resin having a softening point of 145 to 160° C.; and 0.05 to 2 weight percent of benzoin; wherein the composition comprises less than or equal to 0.3 weight percent tridecyl phosphite; wherein the composition comprises less than or equal to 1 weight percent of fillers; and wherein all weight percents are based on the total weight of the composition, unless a different weight basis is specified.

Another embodiment is an article comprising one of the compositions described herein.

These and other embodiments are described in detail below.

DETAILED DESCRIPTION OF THE INVENTION

The present inventor has determined that an improved balance of high light transmittance, low haze, and high impact strength is exhibited by a composition comprising: 30 to 60 weight percent of a poly(phenylene ether); 10 to 40 weight percent of a radial block copolymer of an alkenyl aromatic monomer comprising styrene and a conjugated diene comprising butadiene; wherein the radial block copolymer comprises 60 to 75 weight percent of poly(alkenyl aromatic) content and has a number average molecular weight of 50,000 to 70,000 atomic mass units; 5 to 20 weight percent of a polystyrene-poly(ethylene-butylene)-polystyrene triblock copolymer having a polystyrene content based on the weight of the triblock copolymer of 55 to 80 weight percent; 5 to 20 weight percent of an organophosphate ester selected from the group consisting of resorcinol bis(diphenyl phosphate), triphenyl phosphate, alkylated triphenyl phosphate, and combinations thereof; a hydrocarbon resin selected from the group consisting of hydrogenated alicyclic hydrocarbon resins, hydrogenated terpene resins, and combinations thereof; wherein the hydrocarbon resin has a softening point of 120 to 180° C. measured according to ASTM E28; wherein the hydrocarbon resin is present in an amount effective to provide the composition with a multiaxial impact strength of at least 25 joules, measured at 23° C. according to ASTM D3763-08a; and 0.05 to 2 weight percent of benzoin; wherein the composition comprises less than 0.5 weight percent tridecyl phosphite; wherein the composition comprises less than or equal to 1 weight percent of fillers; and wherein all weight percents are based on the total weight of the composition, unless a different weight basis is specified. Specifically, the composition can exhibit a multiaxial impact strength of at least 25 joules measured at 23° C. according to ASTM D3763-08, a haze of less than or equal to 15 percent measured at 23° C. according to ASTM D1003-00 at a thickness of 3.2 millimeters, and a transmittance of at least 75 percent measured at 23° C. according to ASTM D1003-00 at a thickness of 3.2 millimeters. Within the limit of at least 25 joules, the multiaxial impact strength can be 25 to 60 joules, specifically 30 to 55 joules, more specifically 35 to 55 joules. Within the limit of less than or equal to 15 percent, the haze can be 2 to 15 percent, specifically 2 to 10 percent, more specifically 3 to 5 percent. Within the limit of at least 75 percent, the transmittance can be 75 to 85 percent, specifically 77 to 82 percent, more specifically 80 to 82 percent.

The composition comprises a poly(phenylene ether). Suitable poly(phenylene ether)s include those comprising repeating structural units having the formula

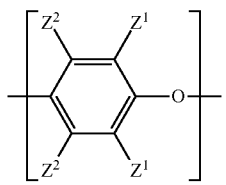

wherein each occurrence of $Z^1$ is independently halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each occurrence of $Z^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms. As used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. However, when the hydrocarbyl residue is described as substituted, it may, optionally, contain heteroatoms over and above the carbon and hydrogen members of the substituent residue. Thus, when specifically described as substituted, the hydrocarbyl residue can also contain one or more carbonyl groups, amino groups, hydroxyl groups, or the like, or it can contain heteroatoms within the backbone of the hydrocarbyl residue. As one example, $Z^1$ can be a di-n-butylaminomethyl group formed by reaction of a terminal 3,5-dimethyl-1,4-phenyl group with the di-n-butylamine component of an oxidative polymerization catalyst.

In some embodiments, the poly(phenylene ether) has an intrinsic viscosity of 0.25 to 1 deciliter per gram measured at 25° C. in chloroform. Within this range, the poly(phenylene ether) intrinsic viscosity can be 0.3 to 0.65 deciliter per gram, more specifically 0.35 to 0.5 deciliter per gram, even more specifically 0.4 to 0.5 deciliter per gram.

In some embodiments, the poly(phenylene ether) is essentially free of incorporated diphenoquinone residues. In this context, "essentially free" means that fewer than 1 weight percent of poly(phenylene ether) molecules comprise the residue of a diphenoquinone. As described in U.S. Pat. No. 3,306,874 to Hay, synthesis of poly(phenylene ether) by oxidative polymerization of monohydric phenol yields not only the desired poly(phenylene ether) but also a diphenoquinone as side product. For example, when the monohydric phenol is 2,6-dimethylphenol, 3,3',5,5'-tetramethyldiphenoquinone is generated. Typically, the diphenoquinone is "reequilibrated" into the poly(phenylene ether) (i.e., the diphenoquinone is incorporated into the poly(phenylene ether) structure) by heating the polymerization reaction mixture to yield a poly(phenylene ether) comprising terminal or internal diphenoquinone residues). For example, when a poly(phenylene ether) is prepared by oxidative polymerization of 2,6-dimethylphenol to yield poly(2,6-dimethyl-1,4-phenylene ether) and 3,3',5,5'-tetramethyldiphenoquinone, reequilibration of the reaction mixture can produce a poly(phenylene ether) with terminal and internal residues of incorporated diphenoquinone. However, such reequilibration reduces the molecular weight of the poly(phenylene ether). Accordingly, when a higher molecular weight poly(phenylene ether) is desired, it can be useful to separate the diphenoquinone from the poly(phenylene ether) rather than reequilibrating the diphenoquinone into the poly(phenylene ether) chains. Such a separation can be achieved, for example, by precipitation of the poly(phenylene ether) in a solvent or solvent mixture in which the poly(phenylene ether) is insoluble and the diphenoquinone is soluble. For example, when a poly(phenylene ether) is prepared by oxidative polymerization of 2,6-dimethylphenol in toluene to yield a toluene solution comprising poly(2,6-dimethyl-1,4-phenylene ether) and 3,3',5,5'-tetramethyldiphenoquinone, a poly(2,6-dimethyl-1,4-phenylene ether) essentially free of diphenoquinone can be obtained by mixing 1 volume of the toluene solution with 1 to 4 volumes of methanol or a methanol/water mixture. Alternatively, the amount of diphenoquinone side-product generated during oxidative polymerization can be minimized (e.g., by initiating oxidative polymerization in the presence of less than 10 weight percent of the monohydric phenol and adding at least 95 weight percent of the monohydric phenol over the course of at least 50 minutes), and/or the reequilibration of the diphenoquinone into the poly(phenylene ether) chain can be minimized (e.g., by isolating the poly(phenylene ether) no more than 200 minutes after termination of oxidative polymerization). These approaches are described in U.S. Patent Application Publication No. US 2009/0211967 A1 of Delsman et al. In an alternative approach utilizing the temperature-dependent solubility of diphenoquinone in toluene, a toluene solution containing diphenoquinone and poly(phenylene ether) can be adjusted to a temperature of about 25° C., at which diphenoquinone is poorly soluble but the poly(phenylene ether) is soluble, and the insoluble diphenoquinone can be removed by solid-liquid separation (e.g., filtration).

In some embodiments, the poly(phenylene ether) comprises 2,6-dimethyl-1,4-phenylene ether units, 2,3,6-trimethyl-1,4-phenylene ether units, or a combination thereof. In some embodiments, the poly(phenylene ether) is a poly(2,6-dimethyl-1,4-phenylene ether). In some embodiments, the poly(phenylene ether) comprises a poly(2,6-dimethyl-1,4-phenylene ether) having an intrinsic viscosity of 0.3 to 0.65 deciliter per gram, more specifically 0.35 to 0.5 deciliter per gram, even more specifically 0.4 to 0.5 deciliter per gram, measured at 25° C. in chloroform.

The poly(phenylene ether) can comprise molecules having aminoalkyl-containing end group(s), typically located in a position ortho to the hydroxy group. Also frequently present are tetramethyldiphenoquinone (TMDQ) end groups, typically obtained from 2,6-dimethylphenol-containing reaction mixtures in which tetramethyldiphenoquinone by-product is present. The poly(phenylene ether) can be in the form of a homopolymer, a copolymer, a graft copolymer, an ionomer, or a block copolymer, as well as combinations thereof. In some embodiments, the composition comprises less than or equal to 0.5 weight percent (i.e., 0 to 0.5 weight percent) of a poly(phenylene ether)-polysiloxane block copolymer. Within this limit, the maximum amount of poly(phenylene ether)-polysiloxane block copolymer can be 0.1 weight percent. In some embodiments, the composition excludes poly(phenylene ether)-polysiloxane block copolymer.

The composition comprises the poly(phenylene ether) in an amount of 30 to 60 weight percent, based on the total weight of the composition. Within this range, the poly(phenylene ether) amount can be 35 to 55 weight percent, more specifically 40 to 50 weight percent.

In addition to the poly(phenylene ether), the composition comprises a radial block copolymer of an alkenyl aromatic monomer and a conjugated diene. As used herein, the term "radial block copolymer" refers to a branched polymer comprising poly(conjugated diene) blocks, poly(alkenyl aromatic) blocks, and the residue of a coupling agent that acts as a branching point or radius of the radial block copolymer. More particularly, in the radial block copolymer structure, multiple chains of the poly(conjugated diene) polymer, usually three or more, are each covalently bound at one end to the residue of a coupling agent and covalently bound at the other end to a block of the poly(alkenyl aromatic). In some embodiments, the radial block copolymer consists of the poly(conjugated diene) blocks, the poly(alkenyl aromatic) blocks, and the residue of the coupling agent. For example, the radial block copolymer can exclude residues derived from other polymerizable monomers.

The alkenyl aromatic monomer used to form the radial block copolymer can have the structure

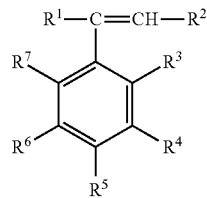

wherein $R^1$ and $R^2$ each independently represent a hydrogen atom, a $C_1$-$C_8$ alkyl group, or a $C_2$-$C_8$ alkenyl group; $R^3$ and $R^7$ each independently represent a hydrogen atom, a $C_1$-$C_8$ alkyl group, a chlorine atom, or a bromine atom; and $R^4$-$R^6$ each independently represent a hydrogen atom, a $C_1$-$C_8$ alkyl group, or a $C_2$-$C_8$ alkenyl group; or $R^3$ and $R^4$ are taken together with the central aromatic ring to form a naphthyl group, or $R^4$ and $R^5$ are taken together with the central aromatic ring to form a naphthyl group. Suitable alkenyl aromatic monomers include, for example, styrene, chlorostyrenes such as p-chlorostyrene, methylstyrenes such as alpha-methylstyrene and p-methylstyrene, and combinations thereof. In some embodiments, the alkenyl aromatic monomer is styrene.

The conjugated diene used to form the radial block copolymer can be, for example, 1,3-butadiene, 2-methyl-1,3-butadiene, 2-chloro-1,3-butadiene, 2,3-dimethyl-1,3-butadiene, 1,3-pentadiene, 1,3-hexadiene, and combinations thereof. In some embodiments, the conjugated diene is 1,3-butadiene. In some embodiments, the conjugated diene is 2-methyl-1,3-butadiene (isoprene).

The coupling agent can be any compound capable of joining at least three block copolymers. Examples of such compounds are multivinyl aromatic compounds, multiepoxide compounds (including epoxidized soybean oils), multiisocyanate compounds, multiimine compounds, multialdehyde compounds, multiketone compounds, multihalide compounds, multianhydride compounds, multiester compounds, and combinations thereof. The amount of coupling agent is typically 0.1 to 1 weight percent based on the weight of the radial block copolymer.

In some embodiments, the radial block copolymer comprises a poly(alkenyl aromatic) content of 50 to 70 weight percent, specifically 60 to 70 weight percent, more specifically 65 to 70 weight percent, based on the weight of the radial block copolymer. Poly(alkenyl aromatic) content can be determined by proton nuclear magnetic resonance spectroscopy ($^1$H NMR).

In some embodiments, the radial block copolymer has a number average molecular weight of 50,000 to 70,000 atomic mass units. Within this range, the number average molecular weight can be 57,000 to 67,000 atomic mass units. In some embodiments, the radial block copolymer has a weight average molecular weight of 130,000 to 170,000 atomic mass units, specifically 140,000 to 160,000 atomic mass units. In some embodiments, the radial block copolymer has a polydispersity (weight average molecular weight divided by number average molecular weight) of 1.94 to 2.98.

A gel permeation chromatography method for determining the molecular weight characteristics is as follows. A 20 milligram sample of block copolymer is dissolved in 20 milliliters chloroform with 2 parts per thousand by weight toluene (as a flow marker). After the block copolymer is dissolved, the sample is ready to be analyzed by gel permeation chromatography with detection at 254 nanometers. The chromatography equipment includes a Hewlett Packard HPLC 1100 series chromatograph equipped with a PL gel 5 micrometer*$10^3$ Å column, a PL gel 5 micrometer*$10^5$ Å column, and a 500 Å Styragel packing pre-column. The columns are maintained at 35° C. during the analysis. The injection volume is 75 microliters, and injection samples are pre-filtered through a 0.45 micrometer "greenband" filter. The eluent is chloroform and the run time is 16 minutes. Data in the polystyrene molecular weight range of 2,000 to 1,000,000 atomic mass units (AMU) is used to calculate values of number average molecular weight and weight average molecular for the block copolymers. The analysis is calibrated with polystyrene monodisperse calibration standards, such as Polymer Laboratories Easivial Standards Part No. PL12541A.

In some embodiments, the radial block copolymer is not hydrogenated (that is, it is "unhydrogenated"). Specifically, residual aliphatic unsaturation in the poly(conjugated diene) block resulting from polymerization of the conjugated diene is not reduced by hydrogenation.

In some embodiments, the radial block copolymer is less than 5 percent crosslinked, based on the total number of aliphatic carbon-carbon double bonds in the radial block copolymer. Specifically, the radial block copolymer is not intentionally crosslinked by treatment with radiation or chemical agents capable of forming covalent crosslinks between the poly(conjugated diene) blocks of different radial block copolymer molecules.

Methods of preparing radial block copolymers are known in the art and include the methods described in, for example, U.S. Pat. No. 3,281,383 to Zelinski et al., U.S. Pat. No. 3,639,517 to Kitchen et al., U.S. Pat. No. 4,180,530 to Bi et al., and U.S. Pat. No. 6,127,487 to Ahmed et al. Radial block copolymers are also commercially available as K-RESIN from Chevron Phillips Chemical Company, including KK38, KR01, KR03, and KR05.

In some embodiments, the radial block copolymer has a polystyrene content of 65 to 70 weight percent, a polybutadiene content of 30 to 35 weight percent, a number average molecular weight of 57,000 to 67,000 atomic mass units, a weight average molecular weight of 130,000 to 170,000 atomic mass units, and a polydispersity of 1.94 to 2.98. In some embodiments, this radial block copolymer comprises a first polystyrene block with a first number average molecular weight and a second polystyrene block with a second number average molecular weight that is at least two times the first number average molecular weight. Radial block copolymers described in this paragraph can be prepared according to the method of U.S. Pat. No. 3,281,383 to Kitchen et al. In some embodiments, the radial block copolymer has 20 to 30 weight percent of the residue of 1,4-addition of butadiene, and 2 to 12 weight percent of the residue of 1,2-addition of butadiene (both based on the weight of the radial block copolymer), and a ratio of 1,4-addition to 1,2-addition of 2.5:1 to 5:1. In some embodiments of the radial block copolymer, among the residue of 1,4-addition of butadiene the ratio of cis to trans double bonds is 1:1 to 2:1. A suitable example of such a radial block copolymer is K-RESIN KK38 from Chevron Phillips, having a polystyrene content of about 68 weight percent, a polybutadiene content of about 32 weight percent, a number average molecular weight of about 63,000, a weight average molecular weight of about 149,000, a polydispersity of about 2.4, and a melt flow rate of about 9 grams per 10 minutes measured at 200° C. and 5 kilograms load according to ASTM D1238-10. K-RESIN KK38 has about 25 weight percent of the residue of 1,4-addition of butadiene, and about 7 weight percent of the residue of 1,2-addition of butadiene, corresponding to a ratio of 1,4-addition to 1,2-addition of about 3.6:1. Among the residue of 1,4-addition of butadiene, the ratio of cis to trans double bonds is about 1.4:1. The weight percents of residues of 1,2-addition of butadiene and 1,4-addition of butadiene, as well as the ratio of cis to trans double bonds in the residue of 1,4-addition of butadiene, can be determined by $^1$H NMR.

The composition comprises the radial block copolymer in an amount of 10 to 40 weight percent, based on the total weight of the composition. Within this range, the radial block copolymer amount can be 15 to 35 weight percent, specifically 20 to 30 weight percent.

In addition to the poly(phenylene ether) and the radial block copolymer, the composition comprises a polystyrene-poly(ethylene-butylene)-polystyrene triblock copolymer having a polystyrene content based on the weight of the triblock copolymer of 55 to 80 weight percent. Within the range of 55 to 80 weight percent, the polystyrene content can be 60 to 75 weight percent.

The poly(ethylene-butylene) block of the polystyrene-poly(ethylene-butylene)-polystyrene triblock copolymer is derived from hydrogenation of the polybutadiene block of a polystyrene-polybutadiene-polystyrene triblock copolymer.

In some embodiments, the polystyrene-poly(ethylene-butylene)-polystyrene triblock copolymer excludes the residue of monomers other than styrene and butadiene. In these embodiments, it does not comprise grafts formed from these or any other monomers. It also consists of carbon and hydrogen atoms and therefore excludes heteroatoms.

Methods for preparing polystyrene-poly(ethylene-butylene)-polystyrene triblock copolymer are known in the art and polystyrene-poly(ethylene-butylene)-polystyrene triblock copolymers are commercially available. Illustrative commercially available polystyrene-poly(ethylene-butylene)-polystyrene triblock copolymers include KRATON A1535 H Polymer comprising 57 weight percent polystyrene and available from Kraton Performance Polymers Inc.; TUFTEC H1043 comprising 67 weight percent polystyrene and available from Asahi Kasei Elastomer; SEPTON 8104 comprising 60 weight polystyrene and available from Kuraray; and SEPTON 8105 comprising 65 weight percent polystyrene and available from Kuraray. Mixtures of two or more polystyrene-poly(ethylene-butylene)-polystyrene triblock copolymers can be used.

In some embodiments, the polystyrene-poly(ethylene-butylene)-polystyrene triblock copolymer has a polystyrene content of 60 to 75 weight percent, specifically 60 to 70 weight percent. Examples of such triblock copolymers include TUFTEC H1043 from Asahi Kasei Elastomer, and SEPTON 8104 and 8105 from Kuraray. In some embodiments, the polystyrene-poly(ethylene-butylene)-polystyrene triblock copolymer is selected from the group consisting of TUFTEC H1043, SEPTON 8105, and combinations thereof. In some embodiments, the polystyrene-poly(ethylene-butylene)-polystyrene triblock copolymer is SEPTON 8105. In some embodiments, the polystyrene-poly(ethylene-butylene)-polystyrene triblock copolymer is TUFTEC H1043.

The composition comprises the polystyrene-poly(ethylene-butylene)-polystyrene triblock copolymer in an amount of 5 to 20 weight percent, based on the total weight of the composition. Within this range, the polystyrene-poly(ethylene-butylene)-polystyrene triblock copolymer amount can be 8 to 17 weight percent, specifically 10 to 14 weight percent.

In addition to the poly(phenylene ether), the radial block copolymer, and the polystyrene-poly(ethylene-butylene)-polystyrene triblock copolymer, the composition comprises an organophosphate ester selected from the group consisting of resorcinol bis(diphenyl phosphate), triphenyl phosphate, alkylated triphenyl phosphate, and combinations thereof. The alkylated triphenyl phosphate can be $C_1$-$C_6$ alkyl groups, for example, methyl or isopropyl. In some embodiments, the organophosphate ester is resorcinol bis(diphenyl phosphate) (CAS Reg. No. 57583-54-7). In some embodiments, the organophosphate ester is triphenyl phosphate (CAS Reg. No. 115-86-6). In some embodiments, the organophosphate ester is isopropylated triphenyl phosphate (CAS Reg. No. 68937-41-7). In some embodiments, the organophosphate ester is a combination of resorcinol bis(diphenyl phosphate) and triphenyl phosphate. In some embodiments, the organophosphate ester is a combination of resorcinol bis(diphenyl phosphate) and isopropylated triphenyl phosphate. Methods of forming resorcinol bis(diphenyl phosphate), triphenyl phosphate, and alkylated triphenyl phosphate are known, and these compounds are commercially available from multiple suppliers.

The composition comprises the organophosphate ester in an amount of 5 to 20 weight percent, based on the total weight of the composition. Within this range, the organophosphate ester amount can be 7 to 17 weight percent, specifically 9 to 15 weight percent.

In addition to the poly(phenylene ether), the radial block copolymer, the polystyrene-poly(ethylene-butylene)polystyrene triblock copolymer, and the organophosphate ester, the composition comprises a hydrocarbon resin. Examples of hydrocarbon resins are aliphatic hydrocarbon resins, hydrogenated aliphatic hydrocarbon resins, aliphatic/aromatic hydrocarbon resins, hydrogenated aliphatic/aromatic hydrocarbon resins, cycloaliphatic hydrocarbon resins, hydrogenated cycloaliphatic resins, cycloaliphatic/aromatic hydrocarbon resins, hydrogenated cycloaliphatic/aromatic hydrocarbon resins, hydrogenated aromatic hydrocarbon resins, terpene resins, hydrogenated terpene resins, terpene-phenol resins, rosins, and rosin esters, hydrogenated rosins and rosin esters, and mixtures thereof. As used herein, "hydrogenated", when referring to the hydrocarbon resin, includes fully, substantially, and partially hydrogenated resins. Suitable aromatic resins include aromatic modified aliphatic resins, aromatic modified cycloaliphatic resins, and hydrogenated aromatic hydrocarbon resins having an aromatic content of 1 to 30 weight percent. Any of the above resins can be grafted with an unsaturated ester or anhydride using methods known in the art. Such grafting can provide enhanced properties to the resin.

Suitable hydrocarbon resins are commercially available and include, for example, EMPR 100, 101, 102, 103, 104, 105, 106, 107, 108, 109, 110, 116, 117, and 118 resins, and OPPERA resins, available from ExxonMobil Chemical Company; ARKON P140, P125, P115, M115, and M135, and SUPER ESTER rosin esters available from Arakawa Chemical Company of Japan; SYLVARES polyterpene resins, styrenated terpene resins and terpene phenolic resins available from Arizona Chemical Company; SYLVATAC and SYLVALITE rosin esters available from Arizona Chemical Company; NORSOLENE aliphatic aromatic resins available from Cray Valley; DERTOPHENE terpene phenolic resins and DERCOLYTE polyterpene resins available from DRT Chemical Company; EASTOTAC resins, PICCOTAC resins, REGALITE and REGALREZ hydrogenated cycloaliphatic/aromatic resins, and PICCOLYTE and PERMALYN polyterpene resins, rosins, and rosin esters available from Eastman Chemical Company; WINGTACK resins available from Goodyear Chemical Company; coumarone/indene resins available from Neville Chemical Company; QUINTONE acid modified C5 resins, C5/C9 resins, and acid-modified C5/C9 resins available from Nippon Zeon; and CLEARON hydrogenated terpene resins available from Yasuhara.

In some embodiments, the hydrocarbon resin comprises a hydrogenated alicyclic hydrocarbon resin, a hydrogenated terpene resin, or a combination thereof. The hydrocarbon resin can have a softening point of at least 120° C. measured according to ASTM E28. Specifically, the softening point can be 120 to 180° C., specifically 130 to 170° C., more specifically 140 to 160° C. In some embodiments, the hydrocarbon resin comprises a hydrogenated alicyclic hydrocarbon resin having a softening point of 120 to 135° C. An example of such a resin is ARKON P125 having a softening point of about 125° C., available from Arakawa Chemical Company, In some embodiments, the hydrocarbon resin comprises a hydrogenated alicyclic hydrocarbon resin having a softening point of 135 to 145° C. An example of such a resin is ARKON P140 having a softening point of about 140° C., available from Arakawa Chemical Company, In some embodiments, the hydrocarbon resin comprises a hydrogenated terpene resin having a softening point of 145 to 160° C. An example of such a resin is CLEARON P150 available from Yasuhara.

The composition comprises the hydrocarbon resin in an amount effective to provide the composition with a multiaxial impact strength of at least 25 joules. In general, the hydrocarbon resin amount can range from 2 to 10 weight percent. The specific amount will depend, in part, on the identity of the hydrocarbon resin and can be determined by the skilled person without undue experimentation. Generally, the amount can be lower when the softening temperature of the hydrogenated terpene resin is higher. For example, when the hydrocarbon resin is a hydrogenated alicyclic hydrocarbon resin having a softening point of 120 to 135° C., it can be used in an amount of 6 to 10 weight percent, specifically 7 to 9 weight percent, based on the total weight of the composition. As another example, when the hydrocarbon resin is a hydrogenated alicyclic hydrocarbon resin having a softening point of 135 to 145° C., it can be used in an amount of 4 to 10 weight percent, specifically 5 to 8 weight percent, based on the total weight of the composition. As yet another example, when the hydrocarbon resin is a hydrogenated terpene resin having a softening point of 145 to 160° C., it can be used in an amount of 2 to 10 weight percent, specifically 3 to 8 weight percent, more specifically 3 to 6 weight percent, based on the total weight of the composition.

In addition to the poly(phenylene ether), the radial block copolymer, the polystyrene-poly(ethylene-butylene)polystyrene triblock copolymer, the organophosphate ester, and the hydrocarbon resin, the composition comprises benzoin (CAS Reg. No. 119-53-9). The composition comprises benzoin in an amount of 0.05 to 2 weight percent, based on the total weight of the composition. Within this range, the benzoin amount can be 0.1 to 1 weight percent, specifically 0.2 to 0.6 weight percent.

The composition can, optionally, further comprise a trihydrocarbyl phosphite. A trihydrocarbyl phosphite is a compound having the general formula $P(OR^8)_3$, wherein each occurrence of $R^8$ is independently $C_1$-$C_{24}$ hydrocarbyl. In some embodiments, the trihydrocarbyl phosphite is a trialkyl phosphite wherein each occurrence of $R^8$ is independently $C_1$-$C_{24}$ alkyl. One example of a trialkyl phosphite is tridecyl phosphite. In some embodiments, the trihydrocarbyl phosphite is an aryl phosphite in which at least one occurrence of $R^8$ is an unsubstituted or substituted $C_6$-$C_{24}$ aryl. In some embodiments, the trihydrocarbyl phosphite is a triaryl phosphite in which each occurrence of $R^8$ is independently an unsubstituted or substituted $C_6$-$C_{24}$ aryl. One example of a triaryl phosphite is tris(2,4-di-tert-butylphenyl)phosphite. When present, the trihydrocarbyl phosphite can be used in an amount of 0.1 to 2 weight percent, specifically 0.3 to 0.6 weight percent, based on the total weight of the composition.

When the trihydrocarbyl phosphite is tridecyl phosphite, it is present at less than 0.5 weight percent, specifically less than or equal to 0.3 weight percent, more specifically less than or equal to 0.1 weight percent, based on the total weight of the composition. In some embodiments, the composition excludes tridecyl phosphite. In some embodiments, the composition excludes any trihydrocarbyl phosphite.

The composition can, optionally, further comprise one or more additives known in the thermoplastics art, as long as they do not substantially detract from the desired properties of the composition. For example, the composition can, optionally, further comprise an additive chosen from stabilizers, mold release agents, lubricants, processing aids, drip retardants, nucleating agents, UV blockers, dyes, antioxidants, anti-static agents, blowing agents, mineral oil, metal deactivators, antiblocking agents, and the like, and combinations thereof. When present, such additives are typically used in a total amount of less than or equal to 5 weight percent, specifically less than or equal to 2 weight percent, more specifically less than or equal to 1 weight percent, based on the total weight of the composition.

In some embodiments, the composition comprises less than or equal to 25 weight percent of total polyolefin, wherein total polyolefin consists of polyolefins and the polyolefin content of block copolymers comprising a poly(alkenyl aromatic) block and a polyolefin block. The composition comprises at least 2.25 weight percent total polyolefin, based on the minimum polystyrene-poly(ethylene-butylene)polystyrene triblock copolymer amount of 5 weight percent and the minimum poly(ethylene-butylene) content of 45 percent in the polystyrene-poly(ethylene-butylene)polystyrene triblock copolymer. In some embodiments, the composition comprises less than 22 weight percent total polyolefin. Reducing the content of total polyolefin improves the flame retardancy of the composition.

The composition can, optionally, minimize or exclude flame retardants other than the organophosphate ester. For example, in some embodiments the composition comprises less than or equal to 0.5 weight percent (i.e., 0 to 0.5 weight percent) of metal dialkylphosphinate. Within this limit, the metal dialkylphosphinate amount can be less than or equal to 0.1 weight percent. In some embodiments, the composition excludes metal dialkylphosphinate. In some embodiments, the composition excludes any flame retardant other than the organophosphate ester, which is preferred for its flow-promoting properties.

The composition can, optionally, minimize or exclude polymers other than the poly(phenylene ether), the radial block copolymer, the polystyrene-poly(ethylene-butylene) polystyrene triblock copolymer, and the hydrocarbon resin. For example, in some embodiments, the composition comprises less than or equal to 1 weight percent (i.e., 0 to 1 weight percent) of any or all of homopolystyrenes, rubber-modified polystyrenes, polyamides, polyolefins, and polyesters. Within this limit, the maximum amount of any of these polymers can be 0.5 weight percent, or 0.1 weight percent. In some embodiments, the composition excludes any of these polymers. In some embodiments, the composition excludes polymers other than the poly(phenylene ether), the radial block copolymer, the polystyrene-poly(ethylene-butylene) polystyrene triblock copolymer, and the hydrocarbon resin.

The composition minimizes or excludes fillers that detract from the desired optical properties of the composition. Such fillers include, for example, fibrous fillers (such as glass fibers), platy fillers (such as talc, clay, and mica), and nonreinforcing fillers (such as silica and alumina). Additional fillers, including those characterized as "reinforcements" are described in R. Gachter and H. Muller, Editors, "Plastics Additives Handbook; Stabilizers, Processing Aids, Plasticizers, Fillers, Reinforcements, Colorants for Thermoplastics, 3rd Edition", New York: Hanser Publishers, 1990, in Chapter 9, "Fillers and Reinforcements", by H. P. Schlumpf. The composition comprises less than or equal to 1 weight percent (i.e., 0 to 1 weight percent) of fillers, based on the total weight of the composition. Within this limit, the maximum filler amount can be 0.5 weight percent, or 0.1 weight percent. In some embodiments, the composition excludes fillers.

The composition can, optionally, minimize or exclude pigments that detract from the desired optical properties of the composition. In some embodiments, the composition comprises less than or equal to 0.5 weight percent (i.e., 0 to 0.5 weight percent) of white pigment. Within this limit, the maximum white pigment amount can be 0.1 weight percent. In some embodiments, the composition excludes white pigment. In some embodiments, the composition comprises less than or equal to 0.5 weight percent (i.e., 0 to 0.5 weight percent) of all pigments. Within this limit, the maximum total amount of all pigments can be 0.1 weight percent. In some embodiments, the composition excludes pigments.

In a very specific embodiment, the poly(phenylene ether) comprises poly(2,6-dimethyl-1,4-phenylene ether); the poly(phenylene ether) amount is 40 to 50 weight percent; the radial block copolymer amount is 20 to 30 weight percent; the polystyrene-poly(ethylene-butylene)-polystyrene triblock copolymer has a polystyrene content based on the weight of 60 to 75 weight percent; the polystyrene-poly(ethylene-butylene)-polystyrene triblock copolymer amount is 8 to 17 weight percent; the organophosphate ester is resorcinol bis(diphenyl phosphate); the organophosphate ester amount is 7 to 17 weight percent; the hydrocarbon resin comprises a hydrogenated terpene resin having a softening point of 145 to 160° C.; the hydrocarbon resin amount is 3 to 8 weight percent; the composition comprises less than or equal to 0.3 weight percent tridecyl phosphite; and the composition comprises less than or equal to 1 weight percent of fillers. The composition can exhibit a multiaxial impact strength of at least 45 joules, specifically 45 to 60 joules, measured at 23° C. according to ASTM D3763-08, a haze of less than or equal to 2 percent, specifically 2 to 10 percent, measured at 23° C. according to ASTM D1003-00 at a thickness of 3.2 millimeters, and a transmittance of at least 80 percent, specifically 80 to 85 percent, measured at 23° C. according to ASTM D1003-00 at a thickness of 3.2 millimeters.

The composition can be prepared by melt-blending or melt-kneading the individual components together. The melt-blending or melt-kneading can be performed using common equipment such as ribbon blenders, Henschel mixers, Banbury mixers, drum tumblers, single-screw extruders, twin-screw extruders, multi-screw extruders, co-kneaders, and the like. For example, the present composition can be prepared by melt-blending the components in a twin-screw extruder at a temperature of 260 to 310° C., specifically 280 to 300° C. In some embodiments, the composition is formed by adding all components except for the radial block copolymer to the feed throat of an extruder, and adding the radial block copolymer via an extruder port downstream of the feed throat and upstream of the die.

The composition is useful for molding articles, including animal cages, sheet, film, ink cartridges, tubes, pipes, and pipe fittings. Suitable methods of forming such articles include single layer and multilayer sheet extrusion, injection molding, blow molding, film extrusion, profile extrusion, pultrusion, compression molding, thermoforming, pressure forming, hydroforming, vacuum forming, and the like. Combinations of the foregoing article fabrication methods can be used.

The invention includes at least the following embodiments.

Embodiment 1

A composition comprising: 30 to 60 weight percent of a poly(phenylene ether); 10 to 40 weight percent of a radial block copolymer of an alkenyl aromatic monomer comprising styrene and a conjugated diene comprising butadiene; wherein the radial block copolymer comprises 60 to 70 weight percent of poly(alkenyl aromatic) content and has a number average molecular weight of 50,000 to 70,000 atomic mass units; 5 to 20 weight percent of a polystyrene-poly(ethylene-butylene)-polystyrene triblock copolymer having a polystyrene content based on the weight of the triblock copolymer of 55 to 80 weight percent; 5 to 20 weight percent of an organophosphate ester selected from the group consisting of resorcinol bis(diphenyl phosphate), triphenyl phosphate, alkylated triphenyl phosphate, and combinations thereof; a hydrocarbon resin selected from the group consisting of hydrogenated alicyclic hydrocarbon resins, hydrogenated terpene resins, and combinations thereof; wherein the hydrocarbon resin has a softening point of 120 to 180° C. measured according to ASTM E28; wherein the hydrocarbon resin is present in an amount effective to provide the composition with a multiaxial impact strength of at least 25 joules, measured at 23° C. according to ASTM D3763-08a; and 0.05 to 2 weight percent of benzoin; wherein the composition comprises less than 0.5 weight percent tridecyl phosphite; wherein the composition comprises less than or equal to 1 weight percent of fillers; and wherein all weight percents are based on the total weight of the composition, unless a different weight basis is specified.

Embodiment 2

The composition of embodiment 1, exhibiting a multiaxial impact strength of at least 25 joules, measured at 23° C. according to ASTM D3763-08, a haze of less than or equal to 15 percent, measured at 23° C. according to ASTM D1003-00 at a thickness of 3.2 millimeters, and a transmittance of at least 75 percent, measured at 23° C. according to ASTM D1003-00 at a thickness of 3.2 millimeters.

Embodiment 3

The composition of embodiment 1 or 2, excluding tridecyl phosphite.

Embodiment 4

The composition of any of embodiments 1-3, wherein the polystyrene-poly(ethylene-butylene)-polystyrene triblock copolymer has a polystyrene content based on the weight of 60 to 75 weight percent.

Embodiment 5

The composition of any of embodiments 1-4, wherein the hydrocarbon resin is a hydrogenated alicyclic hydrocarbon resin having a softening point of 120 to 135° C. measured according to ASTM E28 and is used in an amount of 6 to 10 weight percent.

Embodiment 6

The composition of any of embodiments 1-4, wherein the hydrocarbon resin is a hydrogenated alicyclic hydrocarbon resin having a softening point of 135 to 145° C. measured according to ASTM E28 and is used in an amount of 4 to 10 weight percent.

Embodiment 7

The composition of any of embodiments 1-4, wherein the hydrocarbon resin comprises a hydrogenated terpene resin having a softening point of 145 to 160° C. measured according to ASTM E28 and is used in an amount of 2 to 10 weight percent.

Embodiment 8

The composition of any of embodiments 1-7, comprising less than or equal to 0.5 weight percent of a poly(phenylene ether)-polysiloxane block copolymer.

Embodiment 9

The composition of any of embodiments 1-8, comprising less than or equal to 25 weight percent of total polyolefin, wherein total polyolefin consists of polyolefins and the polyolefin content of block copolymers comprising a poly(alkenyl aromatic) block and a polyolefin block.

Embodiment 10

The composition of any of embodiments 1-9, comprising less than or equal to 0.5 weight percent of metal dialkylphosphinate.

Embodiment 11

The composition of any of embodiments 1-10, comprising less than or equal to 1 weight percent of each of polyamides, polyolefins, and polyesters.

Embodiment 12

The composition of embodiment 1, wherein the poly(phenylene ether) comprises poly(2,6-dimethyl-1,4-phenylene ether); wherein the poly(phenylene ether) amount is 40 to 50 weight percent; wherein the radial block copolymer amount is 20 to 30 weight percent; wherein the polystyrene-poly(ethylene-butylene)-polystyrene triblock copolymer has a polystyrene content based on the weight of 60 to 75 weight percent; wherein the polystyrene-poly(ethylene-butylene)-polystyrene triblock copolymer amount is 8 to 17 weight percent; wherein the organophosphate ester is resorcinol bis(diphenyl phosphate); wherein the organophosphate ester amount is 7 to 17 weight percent; wherein the hydrocarbon resin comprises a hydrogenated terpene resin having a softening point of 145 to 160° C.; wherein the hydrocarbon resin amount is 3 to 8 weight percent; wherein the composition comprises less than or equal to 0.3 weight percent tridecyl phosphite; and wherein the composition comprises less than or equal to 1 weight percent of fillers.

Embodiment 12a

A composition comprising: 40 to 50 weight percent of a poly(2,6-dimethyl-1,4-phenylene ether); 20 to 30 weight percent of a radial block copolymer of styrene and butadiene; wherein the radial block copolymer comprises 60 to 70 weight percent of polystyrene content and has a number average molecular weight of 50,000 to 70,000 atomic mass units; 8 to 17 weight percent of a polystyrene-poly(ethylene-butylene)-polystyrene triblock copolymer; wherein the polystyrene-poly(ethylene-butylene)-polystyrene triblock copolymer having a polystyrene content of 60 to 75 weight percent based on the weight of the polystyrene-poly(ethylene-butylene)-polystyrene triblock copolymer; 7 to 17 weight percent of resorcinol bis(diphenyl phosphate); 3 to 8 weight percent of a hydrogenated terpene resin having a softening point of 145 to 160° C.; and 0.05 to 2 weight percent of benzoin; wherein the composition comprises less than or equal to 0.3 weight percent tridecyl phosphite; wherein the composition comprises less than or equal to 1 weight percent of fillers; and wherein all weight percents are based on the total weight of the composition, unless a different weight basis is specified.

Embodiment 13

The composition of embodiment 12 or 12a, exhibiting a multiaxial impact strength of at least 45 joules, measured at 23° C. according to ASTM D3763-08, a haze of less than or equal to 5 percent, measured at 23° C. according to ASTM D1003-00 at a thickness of 3.2 millimeters, and a transmittance of at least 80 percent, measured at 23° C. according to ASTM D1003-00 at a thickness of 3.2 millimeters.

Embodiment 14

An article comprising the composition of any of embodiments 1-13.

All ranges disclosed herein are inclusive of the endpoints, and the endpoints are independently combinable with each other. Each range disclosed herein constitutes a disclosure of any point or sub-range lying within the disclosed range.

The invention is further illustrated by the following non-limiting examples.

EXAMPLES 1-6, COMPARATIVE EXAMPLES 1-3

These examples illustrate the desirable balance of stiffness, heat resistance, ductility, and optical properties provided by the composition. Components used in these examples are summarized in Table 1.

TABLE 1

| Component | Description |
|---|---|
| PPE 0.46 | Poly(2,6-dimethyl-1,4-phenylene ether), CAS Reg. No. 24938-67-8, having an intrinsic viscosity of about 0.46 deciliter per gram as measured in chloroform at 25° C.; obtained as PPO 646 from SABIC Innovative Plastics. |
| Benzoin | Benzoin (2-hydroxy-2-phenylacetophenone), CAS Reg. No. 119-53-9, obtained from Sinbiotic S.A. DE c.v. (Mexico). |
| HTP | Hydrogenated homopolymer of 1-methyl-4-(1-methylethenyl)-cyclohexone (hydrogenated terpene polymer), CAS Reg. No. 106168-39-2; obtained as CLEARON P150 from Yasuhara Chemical. |
| RBC KK38 | Radial block copolymer of styrene and butadiene having a polystyrene content of about 68 weight percent and a melt flow rate of about 9 grams per 10 minutes measured at 200° C. and 5 kilograms load; obtained as K-RESIN KK38 from Chevron Phillips Chemical Company. |
| SEBS H1043 | Polystyrene-poly(ethylene-butylene)-polystyrene triblock copolymer, CAS Reg. No. 66070-58-4, having a polystyrene content of about 67 weight percent; obtained as TUFTEC H1043 from AKelastomer. |
| RDP | Resorcinol bis(diphenyl phosphate), CAS Reg. No. 57583-54-7; obtained as CR-733S from Daihachi Chemical., as FYROLFLEX RDP from Supresta LLC, or as REOFOS RDP from Great Lakes Chemical Co. Ltd. |
| BPADP | Bisphenol A bis(diphenyl phosphate), CAS Reg. No. 181028-79-5; obtained as CR-741 from Daihachi Chemical, as FYROLFLEX BDP from Supresta LLC, or as REOFOS BAPP from Great Lakes Chemical Co. Ltd. |
| TPP | Triphenyl phosphate, CAS Reg. No. 115-86-6; obtained from Akzo Nobel. |

Inventive and comparative compositions are summarized in Table 2, where all component amounts are expressed in weight percent based on the total weight of the composition. The compositions were prepared from individual components as follows. Components were compounded in a Werner & Pfleiderer twin-screw extruder having a 30 millimeter internal diameter and operating with barrel temperatures of 240° C./260° C./280° C./290° C./290° C. from feed throat to die. All components were added at the feed throat of the extruder, except for radial block copolymer, which was added downstream at barrel 7 of 10. The extrudate was pelletized, and the pellets dried for a minimum of 2 hours at 90° C. prior to subsequent use for injection molding. The compositions were injection molded into articles for physical testing. Injection molding was conducted on a Van Dorn 120T injection molding machine using barrel temperatures of 530-600° F. (266.7-315.6° C.) and a mold temperature of 190° F. (87.7° C.).

Flexural modulus values, expressed in units of megapascals, were determined at 23° C. according ASTM D790-07e1, using bar cross-sectional dimensions of 3.2 millimeters by 12.7 millimeters, a support span of 50.8 millimeters, a test speed of 1.27 millimeters/minute (0.05 inches/minute), and five specimens per composition. Heat deflection temperature values, expressed in units of degrees centigrade, were determined according to ASTM D648-07, using bar cross-sectional dimensions of 3.2 millimeters by 12.7 millimeters, an edgewise test direction, a support span of 100 millimeters, a load of 1.82 megapascals, a heating rate of 2.0° C./minute, a deflection at reading of 0.25 millimeters, and three specimens per composition. Notched Izod impact strength values, expressed in units of joules/meter, were determined at 23° C. according to ASTM D256-08, using bar cross-sectional dimensions of 3.2 millimeters by 12.7 millimeters, a method A notch with a notch angle of 45° and a notch radius of 0.25 millimeters and a 10.16 millimeter depth of material under the notch, a hammer energy of 2.71 joules (2 foot-pounds), and five specimens per composition. Multi-axial impact strength values, expressed in units of joules, were determined at 23° C. according to ASTM D3763-08 using a test velocity of 3.3 meters per second, a specimen thickness of 3.2 millimeters, a clamp hole diameter of 76 millimeters, a dart diameter of 12.7 millimeters, and 5 specimens per composition. Tensile elongation values, expressed in units of percent, and tensile strength at yield values, expressed in units of megapascals, were determined at 23° C. according to ASTM D638-08, using a Type I bar, a bar thickness of 3.2 millimeters, a gage length of 50 millimeters, a grip separation of 115 millimeters, a testing speed of 50 millimeters/minute, and 5 specimens per composition. Transmittance and haze values, each expressed in units of percent, were determined at 23° C. according to ASTM D1003-00 at a thickness of 3.2 millimeters.

The property results in Table 2 show that Examples 1-3 (with RDP) and 4-6 (with TPP) exhibit a desirable balance of stiffness, heat resistance, ductility, and optical properties, whereas Comparative Examples 1-3 (with BPADP) are substantially deficient in multiaxial impact strength.

TABLE 2

|  | Ex. 1 | Ex. 2 | Ex. 3 | C. Ex. 1 | C. Ex. 2 | C. Ex. 3 | Ex. 4 | Ex. 5 | Ex. 6 |
|---|---|---|---|---|---|---|---|---|---|
| COMPONENTS | | | | | | | | | |
| PPE 0.46 | 45.4 | 45.2 | 45.0 | 45.4 | 45.2 | 45.0 | 45.4 | 45.2 | 45.0 |
| Benzoin | 0.1 | 0.3 | 0.5 | 0.1 | 0.3 | 0.5 | 0.1 | 0.3 | 0.5 |
| HTP | 5 | 5 | 5 | 5 | 5 | 5 | 5 | 5 | 5 |
| RBC KK38 | 25 | 25 | 25 | 25 | 25 | 25 | 25 | 25 | 25 |
| SEBS H1043 | 12.5 | 12.5 | 12.5 | 12.5 | 12.5 | 12.5 | 12.5 | 12.5 | 12.5 |
| RDP | 12 | 12 | 12 | 0 | 0 | 0 | 0 | 0 | 0 |
| BPADP | 0 | 0 | 0 | 12 | 12 | 12 | 0 | 0 | 0 |
| TPP | 0 | 0 | 0 | 0 | 0 | 0 | 12 | 12 | 12 |
| PROPERTIES | | | | | | | | | |
| Flex. mod. (MPa) | 2130 | 2180 | 2180 | 2350 | 2340 | 2330 | 2090 | 2080 | 2070 |
| HDT (° C.) | 76.5 | 76.7 | 76.7 | 82.6 | 83.2 | 82.4 | 77.1 | 76.6 | 75.5 |

TABLE 2-continued

|  | Ex. 1 | Ex. 2 | Ex. 3 | C. Ex. 1 | C. Ex. 2 | C. Ex. 3 | Ex. 4 | Ex. 5 | Ex. 6 |
|---|---|---|---|---|---|---|---|---|---|
| Notched Izod (J/m) | 31.2 | 28.0 | 30.2 | 29.1 | 27.8 | 29.3 | 25.9 | 28.2 | 25.8 |
| MAI (J) | 55.5 | 42.6 | 54.6 | 12.9 | 7.20 | 4.98 | 51.5 | 49.0 | 49.9 |
| Tens. elong. (%) | 33 | 45 | 33 | 34 | 27 | 25 | 61 | 45 | 51 |
| Tens. strength (MPa) | 56.4 | 56.8 | 56.8 | 61.8 | 61.6 | 61.6 | 52.2 | 51.8 | 52.2 |
| Transmittance (%) | 77.4 | 80.1 | 80.9 | 80.4 | 82.0 | 82.1 | 77.5 | 81.3 | 82.6 |
| Correlated Haze | 5.6 | 4.3 | 4.0 | 3.7 | 4.0 | 4.3 | 4.0 | 3.7 | 3.3 |

What is claimed is:

1. A composition comprising:
   30 to 60 weight percent of a poly(phenylene ether);
   10 to 40 weight percent of a radial block copolymer of an alkenyl aromatic monomer comprising styrene and a conjugated diene comprising butadiene; wherein the radial block copolymer comprises 60 to 70 weight percent of poly(alkenyl aromatic) content and has a number average molecular weight of 50,000 to 70,000 atomic mass units;
   5 to 20 weight percent of a polystyrene-poly(ethylene-butylene)-polystyrene triblock copolymer having a polystyrene content based on the weight of the triblock copolymer of 55 to 80 weight percent;
   5 to 20 weight percent of an organophosphate ester selected from the group consisting of resorcinol bis(diphenyl phosphate), triphenyl phosphate, alkylated triphenyl phosphate, and combinations thereof;
   a hydrocarbon resin selected from the group consisting of hydrogenated alicyclic hydrocarbon resins, hydrogenated terpene resins, and combinations thereof; wherein the hydrocarbon resin has a softening point of 120 to 180° C. measured according to ASTM E28; wherein the hydrocarbon resin is present in an amount effective to provide the composition with a multiaxial impact strength of at least 25 joules, measured at 23° C. according to ASTM D3763-08a; and
   0.05 to 2 weight percent of benzoin;
   wherein the composition comprises less than 0.5 weight percent tridecyl phosphite;
   wherein the composition comprises less than or equal to 1 weight percent of fillers; and
   wherein all weight percents are based on the total weight of the composition, unless a different weight basis is specified.

2. The composition of claim 1, exhibiting
   a multiaxial impact strength of at least 25 joules, measured at 23° C. according to ASTM D3763-08,
   a haze of less than or equal to 15 percent, measured at 23° C. according to ASTM D1003-00 at a thickness of 3.2 millimeters, and
   a transmittance of at least 75 percent, measured at 23° C. according to ASTM D1003-00 at a thickness of 3.2 millimeters.

3. The composition of claim 1, excluding tridecyl phosphite.

4. The composition of claim 1, wherein the polystyrene-poly(ethylene-butylene)-polystyrene triblock copolymer has a polystyrene content based on the weight of 60 to 75 weight percent.

5. The composition of claim 1, wherein the hydrocarbon resin is a hydrogenated alicyclic hydrocarbon resin having a softening point of 120 to 135° C. measured according to ASTM E28 and is used in an amount of 6 to 10 weight percent.

6. The composition of claim 1, wherein the hydrocarbon resin is a hydrogenated alicyclic hydrocarbon resin having a softening point of 135 to 145° C. measured according to ASTM E28 and is used in an amount of 4 to 10 weight percent.

7. The composition of claim 1, wherein the hydrocarbon resin comprises a hydrogenated terpene resin having a softening point of 145 to 160° C. measured according to ASTM E28 and is used in an amount of 2 to 10 weight percent.

8. The composition of claim 1, comprising less than or equal to 0.5 weight percent of a poly(phenylene ether)-polysiloxane block copolymer.

9. The composition of claim 1, comprising less than or equal to 25 weight percent of total polyolefin, wherein total polyolefin consists of polyolefins and the polyolefin content of block copolymers comprising a poly(alkenyl aromatic) block and a polyolefin block.

10. The composition of claim 1, comprising less than or equal to 0.5 weight percent of metal dialkylphosphinate.

11. The composition of claim 1, comprising less than or equal to 1 weight percent of each of polyamides, polyolefins, and polyesters.

12. The composition of claim 1,
   wherein the poly(phenylene ether) comprises poly(2,6-dimethyl-1,4-phenylene ether);
   wherein the poly(phenylene ether) amount is 40 to 50 weight percent;
   wherein the radial block copolymer amount is 20 to 30 weight percent;
   wherein the polystyrene-poly(ethylene-butylene)-polystyrene triblock copolymer has a polystyrene content based on the weight of 60 to 75 weight percent;
   wherein the polystyrene-poly(ethylene-butylene)-polystyrene triblock copolymer amount is 8 to 17 weight percent;
   wherein the organophosphate ester is resorcinol bis(diphenyl phosphate);
   wherein the organophosphate ester amount is 7 to 17 weight percent;
   wherein the hydrocarbon resin comprises a hydrogenated terpene resin having a softening point of 145 to 160° C.;
   wherein the hydrocarbon resin amount is 3 to 8 weight percent;
   wherein the composition comprises less than or equal to 0.3 weight percent tridecyl phosphite; and
   wherein the composition comprises less than or equal to 1 weight percent of fillers.

13. The composition of claim 12, exhibiting
   a multiaxial impact strength of at least 45 joules, measured at 23° C. according to ASTM D3763-08,
   a haze of less than or equal to 5 percent, measured at 23° C. according to ASTM D1003-00 at a thickness of 3.2 millimeters, and a transmittance of at least 80 percent, measured at 23° C. according to ASTM D1003-00 at a thickness of 3.2 millimeters.

14. An article comprising the composition of claim 1.

* * * * *